US00RE40775E

(19) United States
(12) Reissued Patent
Arquilevich et al.

(10) Patent Number: US RE40,775 E
(45) Date of Reissued Patent: Jun. 23, 2009

(54) METHOD FOR ADJUSTING DRIVE ROLLER LINEFEED DISTANCE

(75) Inventors: Dan Arquilevich, Portland, OR (US); Steve O. Rasmussen, Vancouver, WA (US); Vance M. Stephens, Brush Prairie, WA (US)

(73) Assignee: Hewlett-Packard Development Company, L.P., Houston, TX (US)

(21) Appl. No.: 10/279,709

(22) Filed: Oct. 23, 2002

Related U.S. Patent Documents

Reissue of:
(64) Patent No.: 6,137,592
Issued: Oct. 24, 2000
Appl. No.: 09/009,320
Filed: Jan. 20, 1998

(51) Int. Cl.
*B41J 11/00* (2006.01)
*B41J 11/42* (2006.01)
*B41J 11/46* (2006.01)

(52) U.S. Cl. ..... 358/1.8
(58) Field of Classification Search ..... 358/1.12, 358/1.14, 1.18, 1.9, 1.8, 1.5, 406, 504, 1.15; 347/19; 399/15, 9; 101/485
See application file for complete search history.

(56) References Cited

U.S. PATENT DOCUMENTS 4,653,399 A * 3/1987 Kuehfuss ..... 101/485
4,734,868 A 3/1988 DeLacy
5,321,437 A 6/1994 Heeren
5,347,369 A 9/1994 Harrington
5,439,302 A 8/1995 Andou
5,592,202 A 1/1997 Erickson
5,600,350 A 2/1997 Cobbs
5,627,572 A 5/1997 Harrington
5,717,977 A 2/1998 Suzuki
5,889,534 A 3/1999 Johnson
6,356,358 B1 * 3/2002 Kakutani et al. ..... 358/1.7

FOREIGN PATENT DOCUMENTS

JP 5-096796 4/1993
WO WO98/45119 10/1998
WO WO 98 54119 10/1998

OTHER PUBLICATIONS

European Search Report, Mar. 1, 2004, concerning corresponding application 03079057.0, 3 pages.
Patent Abstracts of Japan, vol. 017, No. 439 (M–1462), Aug. 13, 1993 re Japan 05 096796 A (Cahon Inc) Apr. 20, 1993.

* cited by examiner

*Primary Examiner*—Twyler Lamb
*Assistant Examiner*—Myles D. Robinson

(57) ABSTRACT

A difference in feed roller diameter from one printer to another causes a media to advance by a different amount for a given rotation of a drive shaft to which the feed roller is coupled. Such variation in advance distance is a linefeed error. Mean linefeed error is determined and corrected by printing a test plot having several areas. Each area is formed of the same image pattern, but is printed at a different linefeed error adjustment to compensate for mean linefeed error. The different adjustments are prescribed and span a typical compensation range for a given print engine model. The different adjustment factors cause banding to occur in some areas. The user picks one of the test pattern areas which has the highest print quality (i.e., least or no banding). The linefeed adjustment factor corresponding to such area is used for normal printing.

23 Claims, 3 Drawing Sheets

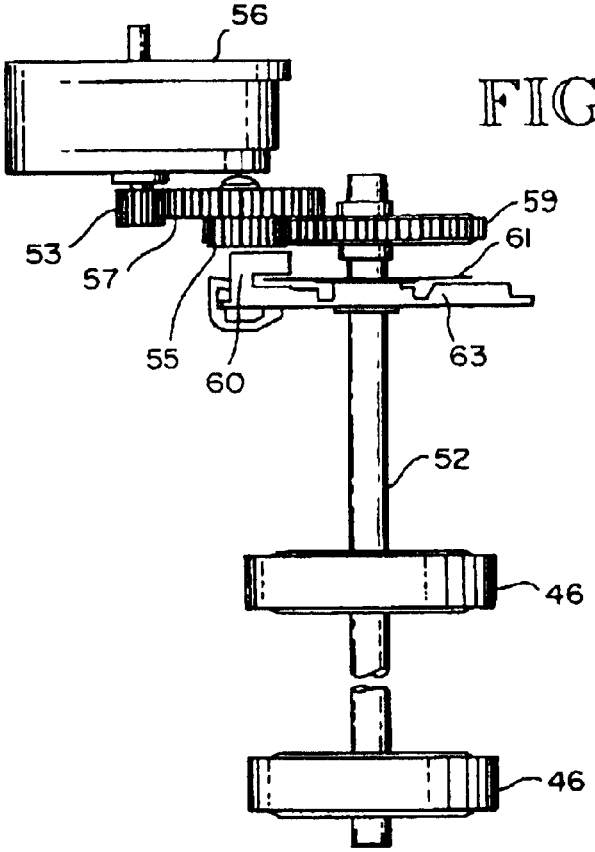
FIG. 3
FIG. 4
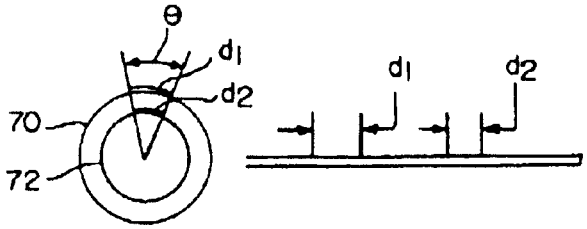
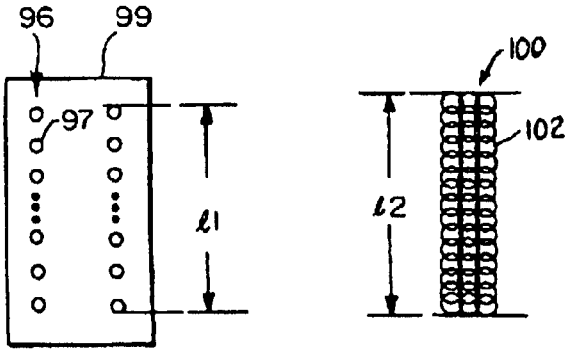
FIG. 6

METHOD FOR ADJUSTING DRIVE ROLLER LINEFEED DISTANCE

Matter enclosed in heavy brackets [ ] appears in the original patent but forms no part of this reissue specification; matter printed in italics indicates the additions made by reissue.

BACKGROUND OF THE INVENTION

This invention relates generally to printing control methods in which a media moves relative to a print source, and more particularly, to a method for controlling a drive shaft of a media roller.

For desktop printers, such as inkjet printers, a media sheet is picked from an input tray and moved along a media path into a print zone where characters, symbols or graphics are printed onto the media sheet. For scanning-type inkjet printers, the media sheet is fed incrementally as a printhead scans across the media sheet. Typically, the media sheet is moved by a linefeed distance between or during printing to a given line.

The media handling system for an inkjet printer includes a set of rollers which move a media sheet along a media path. The rollers are driven by a drive shaft, which in is driven by a drive motor. In many instances there is intermediary gearing for varying the motion of the rollers. A print controller controls the drive motor.

For printing from a desktop computer, a user typically issues a print command within an application program environment. A tile specified by the user then is downloaded to the printer for printing. Typically a printer driver handles the communication interface between the computer and the printer. For text printing a conventional print driver issues linefeed commands within a stream of character data so that the character data is printed in a desired visual format, (e.g., with desired margins and desired line spacing). The print controller controls timing for printing characters that achieve the desired format. Such timing is determined by the print driver commands, the data stream and fixed parameters. The fixed parameters are based upon a given physical configuration of a printer. Linefeed distance typically is based upon one or more of these fixed parameters for text, graphic and imaging processing. For example, for text printing the line spacing (e.g., 1, 1.5 or 2) is based upon the fixed linefeed parameter. This invention is directed to a method for adjusting the linefeed distance.

SUMMARY OF THE INVENTION

According to the invention, mean linefeed error for a print engine is determined and corrected. The print engine is configured to provide closed loop control over a drive shaft. The drive shaft rotates feed rollers which advance a media sheet along a media path. The print engine includes, among other components, a print controller, a drive motor, an encoder, and the drive shaft. The print controller issues signals to the drive motor for controlling the drive motor. The drive motor in turn rotates the drive shaft. The feed rollers are coupled to the drive shaft. The encoder detects the drive shaft position. Such position is fed back to the print controller to complete the closed loop control. The print controller is able to adjust the signal to the motor to control drive shaft movement.

One aspect of this invention is to correct linefeed errors that are not compensated for by the closed loop control of the drive shaft. A source of mean linefeed error in such a closed loop system is feed roller diameter variation. Although the closed loop system accounts for drive shaft position, the diameter of the feed rollers moving with the drive shaft may vary from printer to printer (and may vary over time). Differences in feed roller diameter cause a media to advance by a different amount for a given rotation of the drive shaft. In addition, variation in pinch roller force among printers cause different compression of the feed rollers. Thus, variation in pinch roller force also alters the diameter of the feed rollers, and in turn the media advance distance for a given rotation of the drive shaft.

According to one aspect of this invention, a test plot including several areas is printed. Each area is formed of the same image test pattern, but is printed at a different linefeed adjustment to compensate for mean linefeed error. The different adjustments are prescribed and span a typical compensation range for a given print engine model. The test plot is prescribed to be a test pattern which exhibits characteristics enabling a viewer to perceive the effects of linefeed error. In one embodiment the test pattern is a gray scale pattern. The different adjustment factors for the different areas of the test plot cause a banding artifact to occur. For example, white bands in an area of the plot indicate overfeeding. Dark bands in an area of the plot indicate underfeeding. The user picks the one of the test plot areas which the viewer perceives as having the highest quality (i.e., least or no banding). The linefeed adjustment factor corresponding to such test pattern area is used thereafter for normal printing.

According to another aspect of this invention, a user is able to run the calibration method at any time during the life of the printer to recalibrate the linefeed adjustment factor. Linefeed error is calibrated originally for each given print engine. Linefeed error also can be recalibrated per the user's discretion, per a manufacturer's suggested time interval, or per changes in the environment. It is desirable that a user be able to recalibrate the linefeed error at any time based upon the user's discretion. The manufacturer also may suggest a time interval to recalibrate based upon expected changes over the useful life of the printer. For example, the feed roller diameter may wear down over time. For some print engines this may not introduce a significant change in print quality, but for other high precision print engines even such change in diameter may adversely impact image quality.

According to another aspect of this invention, the print controller tracks the life of the feed rollers, (e.g., pages printed; linear distance printed). In one embodiment, the linefeed error adjustment factor is varied as a function of life of the rollers (e.g., pages printed; linear distance printed).

Changing the environment of the printer also may impact the roller diameter. For example, cooler temperature environments may cause less roller friction than higher temperature environments. A reduced roller friction may cause or alter slippage of the media during rotation of the rollers. Again as print quality standards are driven higher such slippage may not be tolerable. Accordingly, a user can recalibrate when operating in a different environment having a different temperature or humidity.

In an alternative embodiment, the method is used for calibrating swath height error. Swath height error is a variation between the outer distance (in the direction of media travel) among nozzles in a nozzle array of the printhead and the outer distance among dots printed by such nozzles. For example, a printhead having a 0.5 inch printing swath at the printhead surface which results in a 0.501 inch ink swath at the media sheet exhibits a 0.001 inch swath height error. Such error occurs, for example, when the media is not parallel to the printhead (i.e., the distance from a first nozzle to the media is different than from another nozzle to the media). As for the linefeed adjustment correction, a test plot having multiple areas is printed. Each area has the same test pattern, but is printed at a different swath height adjustment factor. Again the best adjustment is perceived by the viewer as the test pattern area with least or no banding. The swath height error adjustment is set to the value corresponding to the selected area of the test plot.

According to another aspect of this invention, the linefeed adjustment factor is varied for different media. Typically, a user is able to pick a paper setting for a document, file or image to be printed. For example, a user often is able to select among standard and non-standard stocks (e.g., weights, thicknesses) of media. Often the user can even pick among specialty media (e.g., photographic paper, transparencies, coated paper, envelopes, index cards, greeting cards, craft project media). In some printers a user can even define custom media, such as fabric, t-shirt transfer media, slide projector images, or lunch bags. The linefeed error may vary according to the media thickness and finish. Thickness directly relates to the media advance for a given rotation of the drive shaft. Finish impacts the linefeed error based upon the variation in friction of the finish. The impact on linefeed error can be computed as a variation relative to standard stock paper with a standard finish. When a user selects a given paper type or stock, the precomputed variation is combined with the calibrated mean linefeed error adjustment to come upon with an new linefeed adjustment to be used when printing such media. Alternatively, a calibration can be performed for any one or more paper stocks and finishes.

One advantage of the invention is that mean linefeed error for a specific printer is calibrated. Thus, manufacturing tolerances for a given printer model (e.g., roller diameter tolerances) which result in different mean linefeed error for different specimens of such model need not be as tight to achieve desired print quality. Another advantage is that calibration can be achieved using the naked eye without the need for separate, expensive measurement devices. Thus, the calibrations can be performed at home, in the office, or at low cost service centers. Another advantage is that the calibration can be reperformed over the life of the printer. An advantage of having a linefeed adjustment factor which varies as a function of the media type is that better print quality is achieved across a wider range of media types and weights.

A benefit of this calibration method is that image size is more accurately controlled. Previously, some printers have not allowed the printing region to span the entire page. A border area at the paper margins has been required to allow a distance for over-advances. Because the over-advancing is being reduced, the area allotted for the image can be increased for a given media size. In addition, better control of image size allows for more accurate reproduction of images because distortion from over-advancing and under-advancing is reduced or eliminated. These and other aspects and advantages of the invention will be better understood by reference to the following detailed description taken in conjunction with the accompanying drawings.

BRIEF DESCRIPTION OF THE DRAWINGS

FIG. 3 is a view of a drive shaft with rollers, drive motor, gearing and encoder for partially implementing close loop control of the drive shaft;

FIG. 4 is a diagram depicting different linefeed distances for rollers of differing diameter;

FIG. 6 is a diagram of a printhead nozzle array and a corresponding array of printed dots.

DESCRIPTION OF SPECIFIC EMBODIMENTS

Host Environment

Figure 1:
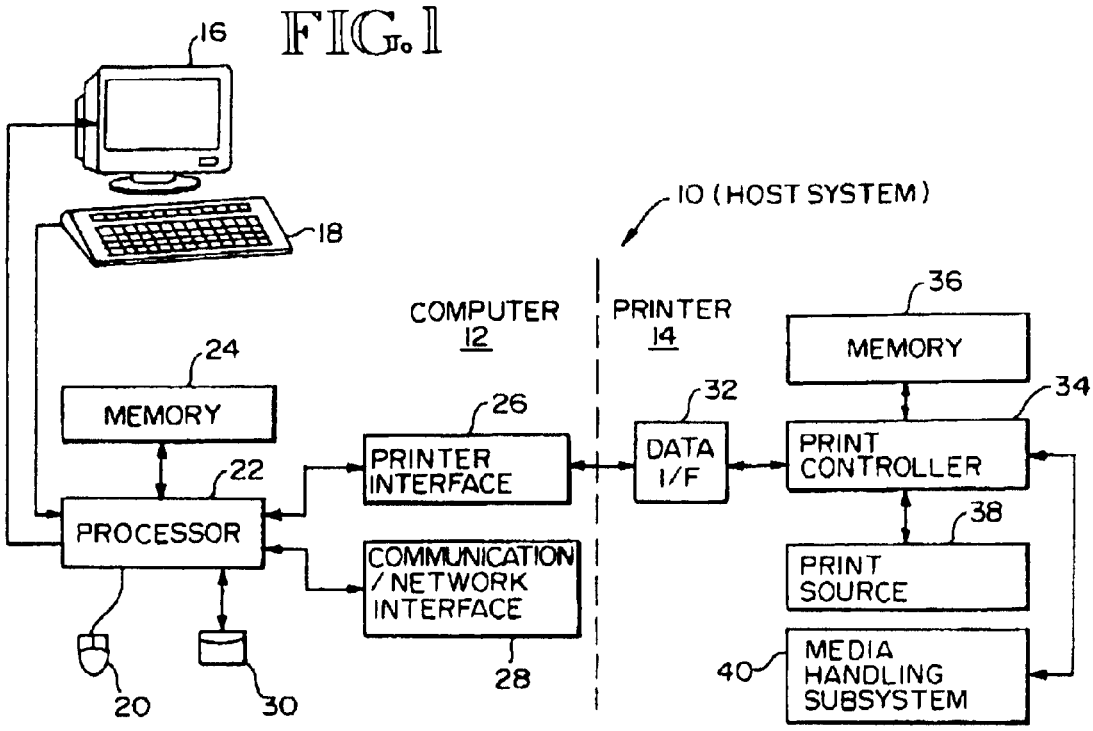
FIG. 1 is a block diagram of a host system for implementing a method embodiment of this invention.

As used herein the term computer includes any device or machine capable of accepting data, applying prescribed processes to the data, and supplying results of the processes. FIG. 1 shows a host system 10, including a computer system 12 of the kind well known in the art, along with a printer 14. The host system 10 is configured to implement the method and apparatus of this invention. The computer system 12 includes a display monitor 16, a keyboard 18, a pointing/clicking device 20, a processor 22, memory 24, a printer interface 26, a communication or network interface 28 (e.g., modem; ethernet adapter), and a non-volatile storage device 30, such as a hard disk drive, floppy disk drive and/or CD-ROM drive. The memory 24 includes storage area for the storage of application program code, operating system code, and data. The processor 22 is coupled to the display 16, the memory 24, the keyboard 18, the point/clicking device 20, the printer interface 26, the communication interface 28 and the storage device 30. The processor 22 communicates with the printer 14 through the printer interface 26 or communication/network interface 28. The interface 28 provides a channel for communication with other computers and data sources linked together in a local area network and/or a wide area network. The computer system 12 may be any of the types well known in the art, such as a mainframe computer, minicomputer, workstation, personal computer, network computer or network terminal. Functions described herein are implemented by the printer 14. Some functions may be performed by the computer system. The function performed by the computer system may be allocated among different computer systems.

The printer 14 includes a data interface 32, a print controller 34, memory 36, a print source 38 and a media handling subsystem 40. Typically a user works in a computing environment on the host system 10. During their work, the user may issue a print command to print out a file, document or image at the printer. Conventionally, the computer 12 includes a print driver stored in memory 24. The print driver includes code and data for implementing communication between the computer 12 and printer 14. When the user issues a print command, one of the variables specified with the command is a file, document, image or portion thereof to be printed. The print driver prepares the document, file, image or portion according to a given protocol as a print job and downloads the print job to the printer 14 via the computer's interface 26 and the printer's data interface 32. The print controller 34 stores the print job data in memory 36 and controls the printing operation. In particular the print controller 34 synchronizes the media handling system 40 and the print source 38 during printing. The print source 38 is, for example, an inkjet pen having a printhead and an array of nozzles. The media handling subsystem 40 picks a media sheet and moves the media sheet along a media path. By synchronizing the ejection of ink onto the media sheet with the movement of the media sheet, an image is printed onto the media sheet.

Media Handling and Control

Figure 2:
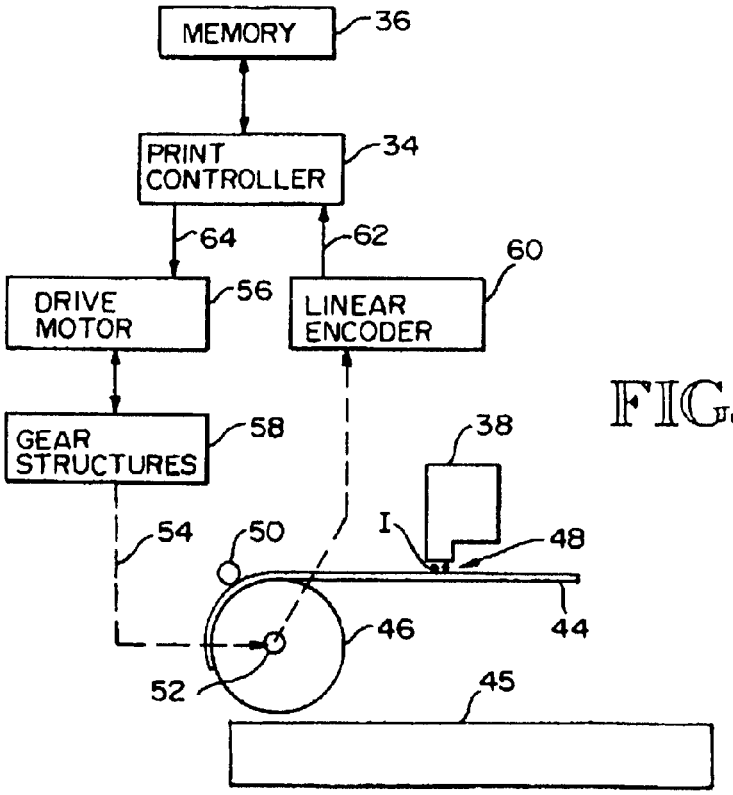
FIG. 2 is a control diagram of the media handling during a print job.

FIG. 2 depicts media handling and control flow for printing to a media sheet 44. The media sheet 44 is picked from an input region, such as a paper tray 45 paper stack or feed slot, and fed by feed rollers 46 along a media path into a print zone 48. The print source 38 is situated to apply ink I or another print substance to the media sheet 44 portion within the print zone 48. For and inkjet printer the print source 38 is an inkjet pen and the print substance includes drops of liquid ink which are ejected from printhead nozzles on the pen. Pinch rollers 50 press the media sheet 44 to the feed rollers 46 so that the rotation of the feed rollers 46 causes the media sheet 44 to progress along the media path.

The feed rollers 46 are mounted onto a drive shaft 52 and move with the drive shaft 52. Referring to FIG. 3, the drive shaft 52 is an elongated axle which rotates under a force 54 generated by a drive motor 56 applied through gear structure 58 (e.g., pinion gear 53, cluster gear components 55, 57, and drive gear 59). A code wheel 61 is located along the drive shaft 52. Encoder 60 reads the position of the code wheel 61. Another encoder 63 is included in some embodiments for calibrating the eccentricity and detecting the home position of the code wheel 61. In one embodiment the drive motor is a stepper motor that moves the drive shaft 52 in steps. The encoder 60 tracks such steps by monitoring the code wheel 61 and generating a feedback signal 62 which is input to the print controller 34. The print controller 34 in turn generates a drive signal 64 for controlling the drive motor 56. The drive signal 64 is derived so as to incrementally turn the drive shaft 52 and incrementally advance the media sheet 44 In another embodiment, the drive signal 64 turns the drive shaft 52 in a continuous manner. Regardless of whether the drive shaft 52 is turned in a continuous manner or in increments, a specific arc turn of the shaft corresponds to a linefeed distance for a print job. Because of the closed loop feedback achieved with the encoder 60, very precise arc turns are achieved by the drive motor 56 at the drive shaft 52. Note, however, that it is the arc rotation of the drive shaft 52 that is controlled, rather than a precise linefeed distance of a media sheet 44. For a given arc rotation the distance a media sheet 44 will move varies depending upon the diameter of the roller 46. A smaller diameter roller will move the media sheet 44 a shorter distance than a larger diameter roller for the same arc rotation of the drive shaft 52. FIG. 4 shows two rollers 70, 72 of differing diameter. Roller 70 has the larger diameter of the two rollers 70, 72. For a given arc rotation (e.g., θ), the media sheet 44 advances a distance d1 if fed along by the larger roller 70, and a distance d2 if fed along by the smaller roller 72. As shown in FIG. 4, feed distance d1 is longer than feed distance d2. Accordingly, even though there is closed loop control of the drive shaft 52, it is desirable to calibrate the linefeed error adjustment to account for variations in roller 46 diameter from one printer to another printer.

It is expected that the rollers 46 of each printer for a given printer model will have approximately the same diameter. However, as desired print quality increases, the tolerances for roller diameter may not be satisfactory to achieve the desired print quality. According to an aspect of this invention, mean linefeed error is determined and corrected so as to calibrate mean linefeed error for a given printer specimen (of a given printer model). Thus, even if two printer specimens 14 have slightly different roller diameters, the mean linefeed error can be calibrated for each specimen so as to print at the desired print quality. Such calibration can be performed in the factory and at times thereafter to account for changes in mean linefeed error caused by (i) wear of the roller 46, (ii) varied pressure applied to the roller 46 by the pinch roller 50, or (iii) different environmental conditions causing the roller 46 to exhibit different coefficients of surface friction. Differences in friction impact the amount of slippage of the media sheet 44 while driven by a roller 46. The coefficient of friction for the roller may vary as the roller 46 wears away and as the printer is operated in different environmental conditions. For example if the printer 14 is moved to a cooler working environment, then the coefficient of friction at the outer surface of the roller 46 may vary causing more slippage to occur. By recalibrating for the new environment, the printer 14 is able to achieve a desired/rated print quality.

Method for Calibrating Mean Linefeed Error

To account for difference in roller diameter from printer to printer a linefeed error adjustment parameter is defined for the specific printer. Such parameter is derive from a calibration process. Given the specific tolerances for the rollers 46 of a printer model, it is expected that the linefeed error adjustment will be within a known range of values. Values within such known range are stored in memory 36 of the printer 14. One of such values is to be selected during the calibration process to serve as the normal value for the linefeed error adjustment parameter.

To perform the calibration process, a user, such as an end user or technician, enters an appropriate command at a user interface. In an alternative embodiment the process is automatically commenced at a given time (e.g., at power up; after a prescribed interval of time; after a prescribed amount of use). For a user-initiated calibration process, the user interface is embodied at a control panel of the printer 14 or by the keyboard 18/mouse 20 and display 16 of the computer system 12. For a control panel embodiment, the user presses a dedicated button or makes a menu selection. For either embodiment of the user-initiated process, a command is generated at the print controller 34 to print out a test plot onto the media sheet 44. Similarly for the automatically started calibration process, a similar command as generated or the print controller 34 determines itself to commence the process.

Figure 5:
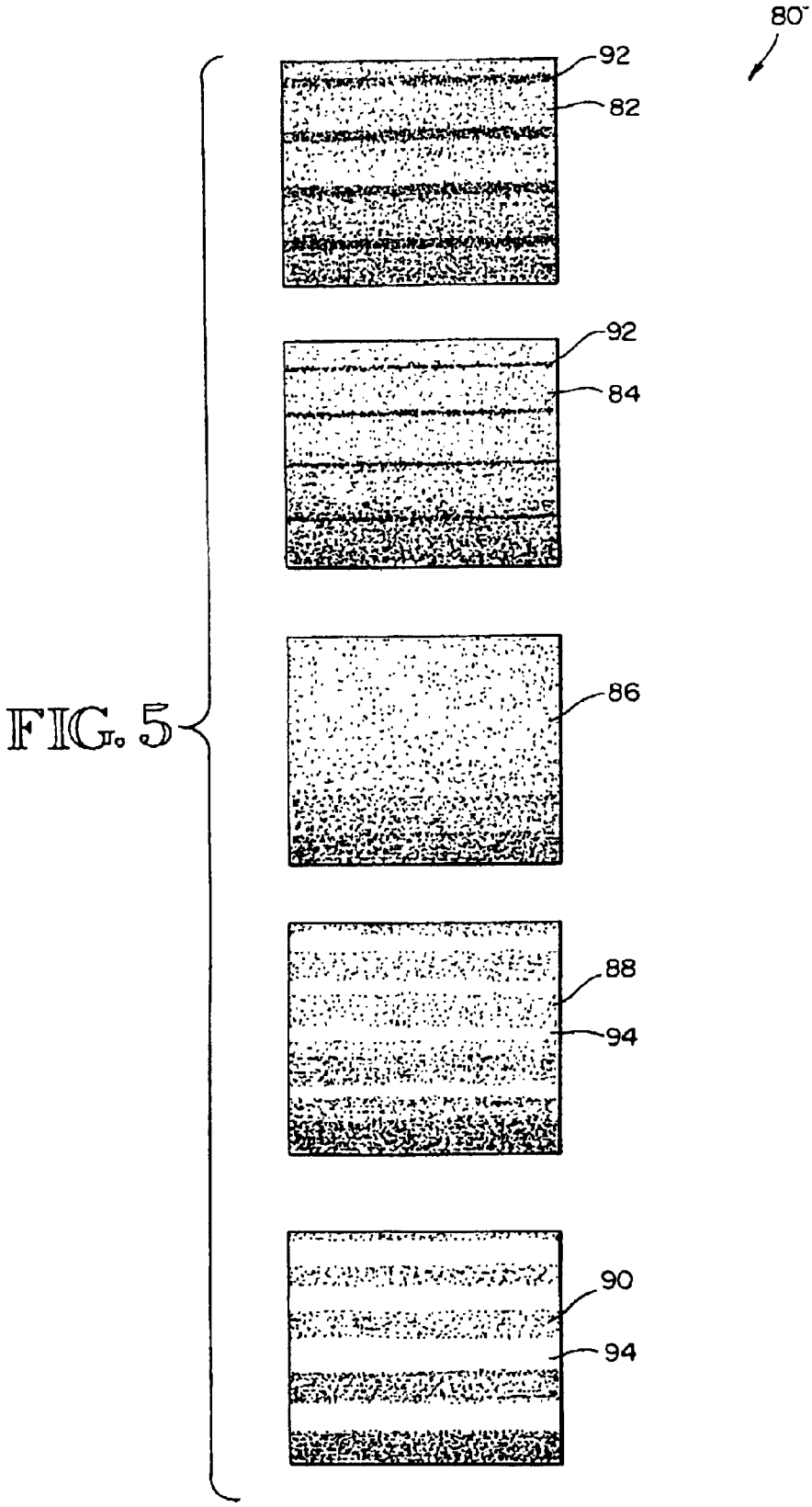
FIG. 5 is a test plot according to an embodiment of this invention.

The print controller 34 causes a test plot to be printed onto the media sheet 44 upon commencement of the calibration process. The test plot is a test pattern which is printed multiple times using different values for the linefeed error adjustment parameter. Such values are those values within the known range of values for the printer model which are stored (e.g., embedded) in memory 36. FIG. 5 shows an examplary test plot 80. The test plot 80 is formed of multiple areas 82, 84, 86, 88 and 90. Each area of the test plot is of a common image pattern. In the illustrated embodiment the common image pattern is a gray scale pattern. Notice that the image pattern gets darker from the top of a respective image area to the bottom of the same image area. In alternative embodiments the pattern may vary along a different direction. Although the image pattern is the same for each area 82–90, a handing artifact occurs to different degrees in the respective image areas 82–90. The degree of banding which occurs in a given area 82–90 will vary depending on the mean linefeed error for the printer specimen being calibrated. For the plot shown in FIG. 5 dark banding occurs in areas 82 and 84, no banding occurs in area 86 and light banding occurs in areas 88 and 90. The dark banding corresponds to under-feeding a linefeed distance. Because the linefeed distance is too little there is an overlap in printing causing dark bands 92 to occur in areas 82 and 84. The light banding corresponds to over-feeding a linefeed distance. Because the linefeed distance is too long, there are blank areas where the ink did not print onto the page. These blank areas are the light bands 94 which appear in areas 88 and 90. Area 86 has no banding because the linefeed distance is just right. As described, above a different value for the linefeed error adjustment parameter is used for each area 82–90. For the illustrated test plot 80, the linefeed error adjustment parameter is successively increased among the areas 82 to 90. As a result, area 82 has the widest dark bands 92. The bands 92 gets narrower in area 84, are absent in area 86 become light bands 94 in area 88 and become wider light bands 94 in area 90. Note that the contrast between the banded and non-banded areas are exaggerated for purposes of illustration. In addition the width of the bands are exaggerated for purposes of illustration. In an actual test plot there is a perceivable difference in banding among the areas 82–90, but not to the exaggerated extent shown in FIG. 5.

With the test plot 80 printed out onto a media sheet 44, the operator is able to view the areas 82–90 and determine which area has the most desirable print quality. It is expected that the most desirable print quality corresponds to the area having no banding or the least banding. For the embodiment illustrated the third area 86 lacks banding. Thus, the operator selects the third area 86. In other exemplary calibration runs a different area may result in the best print quality. The operator inputs the choice of area with the best print quality via the user interface (e.g., the keyboard and/o mouse; or the printer control panel). Alteratively, the operator can terminate the process without calibration occurring, or the process can terminate automatically if the operator does not input a selection within a prescribed time period. Such alternatives are particularly beneficial for the embodiments in which the calibration process commences automatically.

When the operator enters a selection, the print controller 34 receives an indication of the selected area 86. The print controller 34 identifies the linefeed error adjustment parameter value that was used to print the test pattern in the selected area 86 and sets the normal value to such identified value. The normal value is stored in memory (e.g., memory 36; memory 24; or disk 30). Thereafter during normal print jobs, the linefeed error adjustment parameter is such normal value.

The media sheet for calibrating the normal value for the linefeed error adjustment parameter can be any media used by the printer 14. In a preferred embodiment the media sheet 44 used for calibration is a standard stock media of standard finish. In another preferred embodiment the media sheet 44 is the standard media predominantly used for such printer 14. In an alternative embodiment a media sheet supplied according to the manufacturer's specification is used for the calibration.

Adjustments to the Linefeed Error Adjustment Parameter

An operator is able to run the calibration process at any time during the life of the printer 14 to recalibrate the linefeed adjustment factor. Linefeed error is calibrated originally for each given printer specimen. Linefeed error also can be recalibrated per the user's discretion, per a manufacturer's suggested time interval, or per changes in the environment. It is desirable that a user be able to recalibrate the linefeed error at any time based upon the user's discretion. The manufacturer also may suggest a time interval to recalibrate based upon expected changes over the useful life of the printer. For example, the feed roller 46 diameter may wear down over time. For some printers this may not introduce a significant change in print quality, but for other high precision printers, even such change in diameter may adversely impact image quality.

Changing the environment of the printer also may impact the roller diameter. For example, cooler temperature environments may cause less roller friction than higher temperature environments. A reduced roller friction may cause or alter slippage of the media sheet 44 during rotation of the rollers 46. Again as print quality standards are driven higher such slippage may not be tolerable. Accordingly, an operator can recalibrate when operating in a different environment having a different temperature or humidity.

In some embodiments the normal value for the linefeed error adjustment parameter is varied over time or varied temporarily for a given print job. It is expected that over time the diameter of the rollers 46 may change due to wear and pressure from the pinch rollers 50. The change in roller diameter over time is determined empirically during development of a given printer model. Time in such case refers to the amount of printing done by the computer. This can be measured in linear feet that the rollers 46 rotate or number of revolutions of the drive shaft 52, or the number of pages printed, or another measure indicate of, or generally correlating to, wear on the roller 46. Whatever the measure, such measure is tracked during the life of the printer 14 to determine what the expected wear is on the rollers 46. More specifically, a factor for adjusting the normal value is applied. In some embodiments an original normal value is determined at the factory and permanently stored. A current normal value then is derived from this permanent value based upon the life of the printer. For example if rotations of the drive shaft is the measure and is tracked, then the normal value is derived from the permanent value and the current number of rotations of the drive shaft. Such update can occur with every print job or after a prescribed number of drive shaft rotations or upon request by an operator.

In another embodiment whenever an operator recalibrates the linefeed error adjustment parameter the current value of the life measure (e.g., drive shaft rotations) also is stored. When the current normal value is later updated automatically, the value is derived from the previously stored normal value and life measure value and the current life measure value. In such embodiment the permanent normal value may be used with the previously stored normal value and measure and the current measure to interpolate the new normal value.

A temporary value for the linefeed error adjustment parameter also is derived in some embodiments for the specific print job. For example, the linefeed error may vary according to the media thickness and finish. Thickness directly relates to the media advance for a given rotation of the drive shaft. Finish impacts the linefeed error based upon the variation in friction of the finish. The impact on linefeed error can be computed as a variation relative to standard stock paper with a standard finish. When a user selects a given paper type or stock, the precomputed variation is combined with the calibrated mean linefeed error adjustment parameter's normal value to come up with a temporary value to be used when printing such media. Alternatively, a calibration can be performed for any one or more paper stocks and finishes and a normal value stored for each such stock or finish.

Typically, a user specifies the media type for a print job from a menu listing of choices. Often a print driver allows the user to specify standard stock, card stock, or envelope stock. Stock typically refers to a weight or thickness of the media. Some printers also include choices for specialty paper, such as photography paper, glossy/coated paper, transparencies, envelopes, index cards, greeting cards, or craft project media. In some printers a user can even define custom media, such as fabric, t-shirt transfer media, slide projector images, or lunch bags. Factors for altering the normal value are derived during development of a print model and stored in the memory 36 for each media type or thickness or finish supported. When a print job is received the print controller determines the media type, thickness, or finish and adjusts the normal value to derive a temporary value for the linefeed error adjustment parameter for the current job. Such temporary value may be computed at the time of calibration and stored for the given media type, thickness or finish, or may be derived at run-time for each print job. According to one embodiment a temporary value is derived for a given media type as specified for the print job. According to another embodiment a temporary value is derived for a given media thickness specified for the print job. According to yet another embodiment a temporary value is derived for a given media finish as specified for the print job.

Swath Height Error Calibration

In some embodiment the calibration process alternatively or in addition, serves to calibrate a swath height error adjustment parameter. In particular, the calibration process corrects for the presence of both linefeed error and swath height error by deriving either or both of a swath height error adjustment factor or a linefeed error adjustment factor. Swath height error is a variation between the outer distance (in the direction of media travel) among nozzles in a nozzle array of the printhead and the outer distance among dots printed by such nozzles. FIG. 6 shows an array 96 of nozzles 97 on a printhead 98 of a inkjet pen print source 38 Also shown is an array 100 of dots 102 resulting from ejection of ink from such nozzles 97 onto a media sheet 44. The distance 11 corresponds to the linear span of the nozzles 97 in the direction of motion of the media sheet 44 along the media path during printing. The distance 12 corresponds to the linear span of the resulting dots 102 in the same direction of motion. The difference between 12 and 11 is the swath height error. Such error occurs, for example, when the media sheet 44 is not parallel to the printhead 98 (i.e., the distance from a first nozzle to the media is different than from another nozzle to the media). As for the linefeed adjustment correction, a test plot 80 having multiple areas 82–90 is printed as shown in FIG. 5. Each area has the same test pattern (e.g., gray scale image or another pattern), but is printed at a different swath height adjustment factor. Again the best adjustment is perceived by the viewer as the test pattern area of the areas 82–90 with least or no banding. Per the illustrated test plot 80, the area 86 demonstrates the swath height error adjustment parameter value which results in the best print quality. The swath height error adjustment parameter is set to the value corresponding to the selected area of the test plot 80. The indication of which area is selected by the operator is performed in the same manner as described above for the linefeed error adjustment parameter calibration.

Mentonous and Advantageous Effects

One advantage of the invention is that mean linefeed error for a specific printer is calibrated. Thus, manufacturing tolerances for a given printer model (e.g., roller diameter tolerances) which result in different mean linefeed error for different specimens of such model need not be as tight to achieve desired print quality. Another advantage is that calibration is achieved using the naked eye without the need for separate, expensive measurement devices. Thus, the calibrations can be performed at home, in the office, or at low cost service centers. Another advantage is that the calibration can be reperformed over the life of the printer. An advantage of having a linefeed adjustment factor which varies as a function of the media type is that better print quality is achieved across a wider range of media types and weights.

A benefit of this calibration method is that image size is more accurately controlled. Previously, some printers have not allowed the printing region to span the entire page. A border area at the paper margins has been required to allow a distance for over-advances. Because the over-advancing is being reduced, the area allotted for the image can be increased for a given media size. In addition, better control of image size allows for more accurate reproduction of images because distortion from overadvancing and underadvancing is reduced or eliminated.

Although a preferred embodiment of the invention has been illustrated and described, various alternatives, modifications and equivalents may be used. For example, although only drive shaft having one or more rollers has been illustrated, other embodiments may include multiple drive shafts controlled in common through the drive motor and intermediary gear structures. In such embodiment the feedback signal 62 is generated by monitoring the position of one of the drive shafts with the linear encoder 60. In another alternative embodiment one or more sensors are included in the printer to detect the media type, media thickness and/or media stock. For example, an optical sensor is included in one embodiment for detecting transparencies. In another embodiment sensors detect the length and or width of the media sheet to determine the media size. A default media type then is looked up for the media size. This is particularly useful for detecting envelope media and postcard media. Therefore, the foregoing description should not be taken as limiting the scope of the inventions which are defined by the appended claims.

What is claimed is:

1. A method for calibrating, as part of a printing method, a value for a swath height error adjustment of a given inkjet printhead to avoid a banding artifact on a printed media sheet, comprising the steps of:

printing on a media sheet with the given inkjet printhead a test plot having a plurality of non-overlapping areas, each area being a common image printed using a different value of the swath height error adjustment;

receiving an input indicating for which one area of the plurality of areas the common image exhibits either the absence of or the least amount of the banding artifact within said common image as perceived by a person viewing the media;

setting the value to the swath height error adjustment corresponding to the indicated one area, wherein the set value is a first value;

identifying a selected media type for a print job;

determining a second value for the swath height error adjustment for use in printing onto the identified media type;

printing the print job onto a media sheet using the second value for the swath height error adjustment; and prestoring a set of alternate values for the swath height error adjustment, wherein each one of the set of alternate values corresponds to a different media type; and wherein the step of determining comprises looking up one of the set of alternate values based upon the identified media type.

2. A method for determining a [normal] value for a linefeed error adjustment parameter *of a printer*, comprising the steps of:

printing on a media a test plot having a plurality of non-overlapping areas, each area being a common image printed using a different value for the linefeed error adjustment parameter;

receiving an input indicating which one area of the plurality of areas has a highest print quality as perceived by a person viewing the media; [and]

setting the [normal] value of the linefeed error adjustment parameter to the value corresponding to the indicated one area; *and*

[in which the] *varying the* linefeed error *adjustment* parameter value [is] automatically [varied] *in correspondence* with a [schedule] *life cycle* of [roller wear] *the printer*.

3. An apparatus which prints a test plot onto a media sheet to calibrate a normal value for a linefeed error adjustment parameter, the apparatus comprising:

a drive motor;

a drive shaft driven by the drive motor;

a roller coupled to the drive shaft which moves with the drive shaft;

an encoder which generates a first signal corresponding to position of the drive shaft;

a print controller which receives the first signal and in response generates a second signal fed to the drive motor for controlling the drive motor;

memory which stores a test pattern and a range of adjustments for the linefeed error adjustment parameter;

a print source which during calibration of the linefeed error adjustment parameter prints the test plot, the test plot having a plurality of non-overlapping areas, each area including the stored test pattern printed with a different value for the linefeed error adjustment parameter, wherein the different values are based upon the stored range of adjustments of the linefeed error adjustment parameter;

a user interface at which a user generates an input indicating one area of the plurality of areas; and processing means which receives the input and in response sets the normal value for the linefeed error adjustment parameter to be the value corresponding to the indicated one area of the plurality of areas of the test plot;

wherein the drive motor, drive shaft, roller, encoder and print controller are part of a printer, the apparatus further comprising:

means for tracking the use of the printer, and wherein the processing means varies the normal value of the linefeed error parameter value as a function of the tracked usage of the printer.

4. The apparatus of claim 3, wherein the tracking means tracks life of the roller and the processing means varies the normal value of the linefeed error parameter value as a function of the life of the roller.

5. An apparatus which prints a test plot onto a media sheet to calibrate a normal value for a linefeed error adjustment parameter, the apparatus comprising:

a drive motor;

a drive shaft driven by the drive motor;

a roller coupled to the drive shaft which moves with the drive shaft;

an encoder which generates a first signal corresponding to position of the drive shaft;

a print controller which receives the first signal and in response generates a second signal fed to the drive motor for controlling the drive motor;

memory which stores a test pattern and a range of adjustments for the linefeed error adjustment parameter;

a print source which during calibration of the linefeed error adjustment parameter prints the test plot, the test plot having a plurality of non-overlapping areas, each area including the stored test pattern printed with a different value for the linefeed error adjustment parameter, wherein he different values are based upon the stored range of adjustments of the linefeed error adjustment parameter;

a user interface at which a user generates an input indicating one area of the plurality of areas; and processing means which receives the input and in response sets the normal value for the linefeed error adjustment parameter to be the value corresponding to the indicated one area of the plurality of areas of the test plot;

wherein the drive motor, drive shaft, roller, encoder and print controller are part of a printer, and wherein the apparatus further comprises, a host computer, the host computer sending to the printer a command indicating media type for an ensuring print job, the apparatus further comprising:

means for deriving a temporary linefeed error parameter value for use in printing said ensuring print job which is derived as a function of the normal value of the linefeed error adjustment parameter and the indicated media type.

6. An apparatus which prints a test plot onto a media sheet to calibrate a normal value for a linefeed error adjustment parameter, the apparatus comprising:

a drive motor;

a drive shaft driven by the drive motor;

a roller coupled to the drive shaft which moves with the drive shaft;

an encoder which generates a first signal corresponding to position of the drive shaft;

a print controller which receives the first signal and in response generates a second signal fed to the drive motor for controlling the drive motor;

memory which stores a test pattern and a range of adjustments for the linefeed error adjustment parameter;

a print source which during calibration of the linefeed error adjustment parameter prints the test plot, the test plot having a plurality of non-overlapping areas, each area including the stored test pattern printed with a different value for the linefeed error adjustment parameter, wherein the different values are based upon the stored range of adjustments of the linefeed error adjustment parameter;

a user interface at which a user generates an input indicating one area of the plurality of areas; and processing means which receives the input and in response sets the normal value for the linefeed error adjustment parameter to be the value corresponding to the indicated one area of the plurality of areas of the test plot;

wherein the memory stores adjustment factors corresponding to different media types and wherein the processing means adjust the linefeed error adjustment parameter for a given print job based upon the media type for said print job.

7. An apparatus which prints a test plot onto a media sheet to calibrate a normal value for a linefeed error adjustment parameter, the apparatus comprising:

a drive motor;

a drive shaft driven by the drive motor;

a roller coupled to the drive shaft which moves with the drive shaft;

an encoder which generates a first signal corresponding to position of the drive shaft;

a print controller which receives the first signal and in response generates a second signal fed to the drive motor for controlling the drive motor;

memory which stores a test pattern and a range of adjustments for the linefeed error adjustment parameter;

a print source which during calibration of the linefeed error adjustment parameter prints the test plot, the test plot having a plurality of non-overlapping areas, each area including the stored test pattern printed with a different value for the linefeed error adjustment parameter, wherein the different values are based upon the stored range of adjustments of the linefeed error adjustment parameter;

a user interface at which a user generates an input indicating one area of the plurality of areas; and processing means which receives the input and in response sets the normal value for the linefeed error adjustment parameter to be the value corresponding to the indicated one area of the plurality of areas of the test plot;

wherein the memory stores adjustment factors corresponding to different media stocks and wherein the processing means adjusts the linefeed error adjustment parameter for a given print job based upon the media stock for said print job.

8. An apparatus which prints a test plot onto a media sheet to calibrate a normal value for a linefeed error adjustment parameter, the apparatus comprising:

a drive motor;

a drive shaft driven by the drive motor;

a roller coupled to the drive shaft which moves within the drive shaft;

an encoder which generates a first signal corresponding to position of the drive shaft;

a print controller which receives the first signal and in response generates a second signal fed to the drive motor for controlling the drive motor;

memory which stores a test pattern and a range of adjustments for the linefeed error adjustment parameter;

a print source which during calibration of the linefeed error adjustment parameter prints the test plot, the test plot having a plurality of non-overlapping areas, each area including the stored test pattern printed with a different value for the linefeed error adjustment parameter, wherein the different values are based upon the stored range of adjustments of the linefeed error adjustment parameter;

a user interface at which a user generates an input indicating one area of the plurality of areas; and processing means which receives the input and in response sets the normal value for the linefeed error adjustment parameter to be the value corresponding to the indicated one area of the plurality of areas of the test plot;

wherein the memory stores adjustment factors corresponding to different media finishes and wherein the processing means adjusts the linefeed error adjustment parameter for a given print job based upon the media finish for said print job

9. The apparatus of claim 6, wherein the apparatus further comprises a sensor for detecting media type; and means for determining a temporary linefeed error parameter value for use in printing said ensuring print job which is derived as a function of the normal value of the linefeed error adjustment parameter and a detected media type.

10. The apparatus of claim 6, further comprising:

means for identifying a media type for a print job;

means for determining a second value for the linefeed error adjustment parameter for use in printing onto the identified media type.

11. The apparatus of claim 10, wherein memory stores the normal value and a set of alternate values for the normal value for use while printing onto an alternate media type, and wherein the determining means selects the second value from the set of alternative values.

*12. A method for determining a value for a linefeed error adjustment parameter of a printer, comprising the steps of:*

*varying the linefeed error adjustment parameter value automatically in correspondence with a life cycle of the printer by establishing and storing a factor relating to the life cycle of the printer and using the factor for automatically varying the value;*

*periodically updating the factor in relation to a prescribed measure of the life cycle of the printer; and*

*tracking the measure during the life of the printer.*

*13. The method of claim 12 wherein the measure relates to a number of pages printed by the printer.*

*14. The method of claim 12 wherein the measure relates to a distance traversed by pages printed by the printer.*

*15. The method of claim 12 wherein the measure relates to elapsed time during the life cycle of the printer.*

*16. The method of claim 12 wherein the measure relates to a number of rotations of a drive roller that moves pages of media through the printer.*

*17. A method for determining a value for a linefeed error adjustment parameter of a printer, comprising the steps of:*

*varying the linefeed error adjustment parameter value automatically in correspondence with a life cycle of the printer by establishing and storing a factor relating to the life cycle of the printer and using the factor for automatically varying the value*

*wherein the factor is stored when the printer is manufactured.*

*18. A method for determining a value for a linefeed error adjustment parameter of a printer, comprising the steps of:*

*varying the linefeed error adjustment parameter value automatically in correspondence with a life cycle of the printer by establishing and storing a factor relating to the life cycle of the printer and using the factor for automatically varying the value*

*wherein the factor is established during a time that the printer is developed.*

*19. The method of claim 2 wherein the life cycle relates to roller wear of the printer.*

*20. A method of updating the value of a linefeed error adjustment parameter for a printer, comprising:*

*empirically deriving a factor relating to the life cycle of the printer;*

*associating the factor with the printer;*

*automatically periodically updating the factor; and*

*applying the factor to change the value.*

*21. The method of claim 20 wherein the printer has a drive roller, and the measure of the life cycle of the printer is based upon changes in the drive roller during the life cycle of the printer.*

*22. The method of claim 21 including the step of tracking the drive roller changes during the life cycle of the printer.*

*23. The method of claim 22 wherein the driver roller changes relate to the amount of printing done by the printer.*

* * * * *